United States Patent [19]

Stauber et al.

[11] Patent Number: 5,647,588

[45] Date of Patent: Jul. 15, 1997

[54] PROCESS AND DEVICE FOR MEASURING THE THICKNESS OF PRINTED PRODUCTS ON MOVING SUPPORTS

[75] Inventors: Hans-Ulrich Stauber, Grut; Baptist Gruninger, Russikon, both of Switzerland

[73] Assignee: Ferag AG, Hinwil, Switzerland

[21] Appl. No.: 331,228

[22] Filed: Oct. 28, 1994

[30] Foreign Application Priority Data

Oct. 29, 1993 [CH] Switzerland ................ 3269/93

[51] Int. Cl.⁶ ..................................... B65H 7/02
[52] U.S. Cl. ............... 271/259; 271/263; 271/265.02; 271/265.04; 271/275; 250/559.27; 356/381
[58] Field of Search ........................ 271/259, 261, 271/262, 263, 265.02, 265.03, 265.04, 258.05, 277, 275, 314; 33/557, 555, 560, 833–836; 198/502.2; 209/586, 579; 250/559.27; 356/381

[56] References Cited

U.S. PATENT DOCUMENTS

| | | | |
|---|---|---|---|
| 4,078,784 | 3/1978 | Miaskoff et al. ............ | 271/263 X |
| 4,127,266 | 11/1978 | Williams .................. | 271/263 |
| 4,276,480 | 6/1981 | Watson .................. | 250/559.27 X |
| 4,311,392 | 1/1982 | Yazaki et al. ............ | 250/559.27 X |
| 4,456,379 | 6/1984 | Schumann et al. ........ | 356/381 |
| 4,489,930 | 12/1984 | Meier . | |
| 4,498,240 | 2/1985 | Van Dijk ................ | 33/557 X |
| 4,961,270 | 10/1990 | Lisec .................... | 198/502.2 X |
| 5,001,356 | 3/1991 | Ichikawa ................ | 250/559.27 |
| 5,104,108 | 4/1992 | Honegger . | |
| 5,154,279 | 10/1992 | Hänsch . | |
| 5,356,130 | 10/1994 | Infanger ................. | 271/263 |
| 5,568,917 | 10/1996 | Buschhaus et al. ........ | 271/265.04 X |

FOREIGN PATENT DOCUMENTS

| | | | |
|---|---|---|---|
| 250764 | 1/1988 | European Pat. Off. ...... | 356/381 |
| 3300320 | 9/1983 | Germany ................ | 271/263 |
| 39 01 088 | 7/1990 | Germany . | |
| 228907 | 11/1985 | Japan ................... | 356/381 |
| 427 737 | 7/1967 | Switzerland . | |
| 1783300 | 12/1992 | U.S.S.R. ............... | 356/381 |
| 1202108 | 8/1970 | United Kingdom ........ | 198/502.2 |

OTHER PUBLICATIONS

"Thickness–Sensing Gage", IBM Technical Disclosure Bulletin, vol. 34, No. 11, Apr. 1992, pp. 310–311.

Primary Examiner—Boris Milef
Attorney, Agent, or Firm—Bell, Seltzer, Park & Gibson, P.A.

[57] ABSTRACT

The thickness of a printed product resting on a support is measured by a scanning unit which has two sensing elements which can be pressed back against the force of a spring. In a measuring zone, one sensing element is situated on the support and the other sensing element is situated on the printed product. By means of two laser sensors, the length of the distance between the one laser sensor and a measuring face of the first sensing element is measured and the length of the distance between the other laser sensor and a measuring face of the second sensing element is measured. From the difference between the lengths of these two distances, the thickness of the printed product can be determined. By a comparison of this thickness actual value with a prescribed thickness set value, it can then be established whether the product measured is complete or whether pages, parts, or supplements are missing or whether the product has too many pages, parts, or supplements.

18 Claims, 5 Drawing Sheets

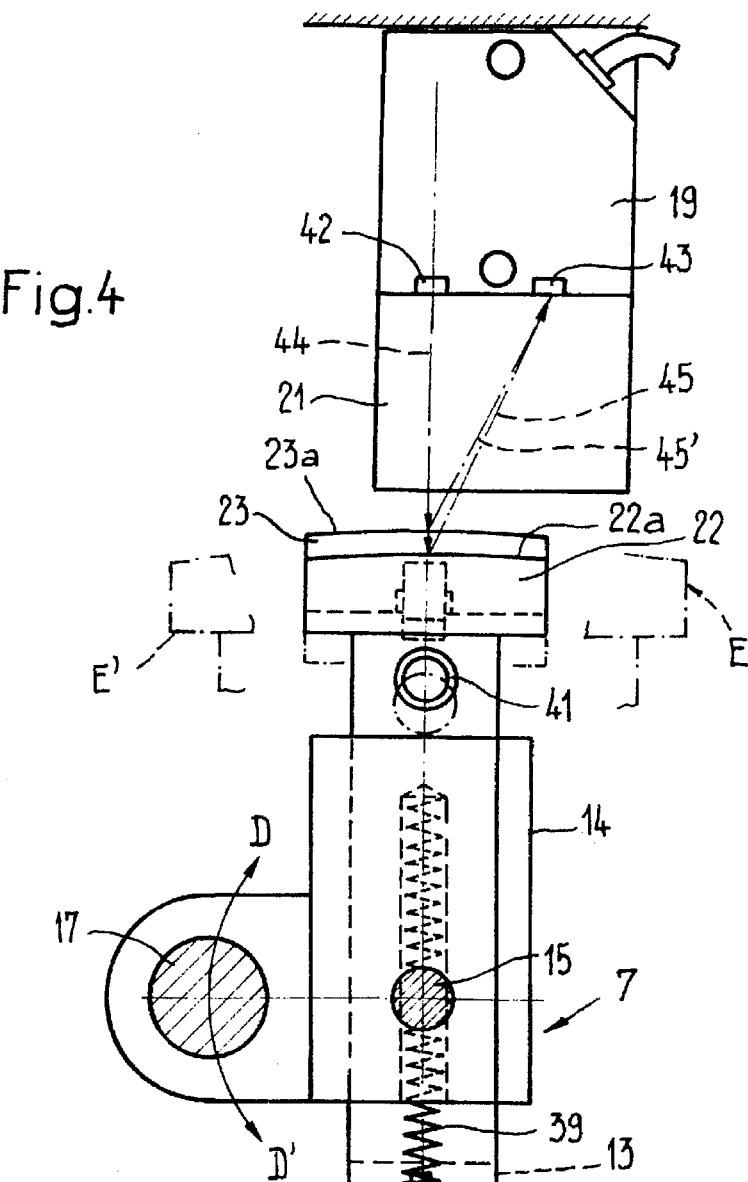
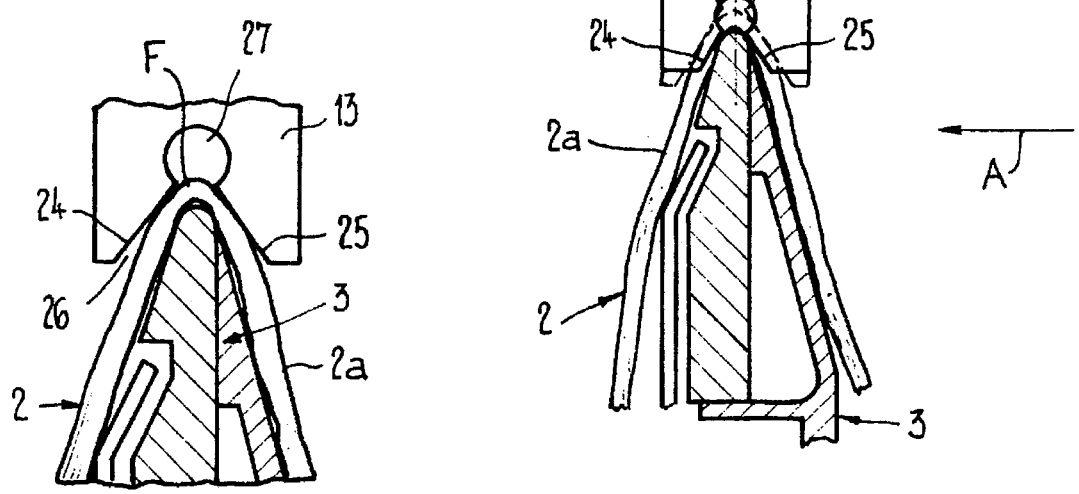
Fig.4
Fig.5

PROCESS AND DEVICE FOR MEASURING THE THICKNESS OF PRINTED PRODUCTS ON MOVING SUPPORTS

FIELD OF THE INVENTION

The present invention relates to a process and a device for measuring the thickness of printed products such as newspapers, periodicals, and portions thereof.

BACKGROUND OF THE INVENTION

Measuring the thickness of printed products during the assembly process is necessary to establish which products have not been put together completely, i.e., which are missing individual pages, parts, and/or supplements. Conventionally, the thickness of printed products is determined by direct measurement of the products themselves. The present invention measures thicknesses utilizing laser beams which detect the relative location of two sensors' distances measured with great accuracy. Prior art thickness detection devices are arranged at various locations along production lines for assembling multi-sheet or multi-part printing products to repeatedly detect and reject defective products. An example of such a device is described in EP-A-0 479 717 and the corresponding U.S. Pat. No. 5,154,279.

It is therefore an object of the present invention to provide a process and a device making it possible to accurately measure the thickness of printed products even when the printed products are moving at high speeds along the production line.

It is a further object of this invention to determine the thickness of printed products being transported during production past the sensor which quickly determines the thickness of the product with great accuracy. The thickness of the printed products may be used to establish whether the printed products have been assembled incompletely; that is, which pages, parts, or supplements are missing, while on the other hand indicating which products contain too many pages, parts, or supplements.

SUMMARY OF THE INVENTION

The above and other objects and advantages of the present invention are achieved by a method and device for measuring the thickness of printed products, when the products are rapidly moving past a measuring station, and wherein the printed products are each supported on a support which advances past a measuring station. A first sensor is provided for detecting a first distance between the first sensor and the support as the support advances past the measuring station, and a second sensor is provided for detecting a second distance between the second sensor and an upper side of the supported printed product as the printed product advances past the measuring station. The difference between the first and second distances is calculated to determine the thickness of the printed product.

The detecting of the first and second distances is achieved by the provision of at least one scanning unit which comprises first and second sensing elements, with the scanning unit being mounted to move along with the support past the measuring station. In addition, the first and second sensing elements each comprise a measuring face which faces respective ones of the first and second sensors. As the sensing elements move past the measuring station, the first sensing element is placed on the surface of the support and the second sensing element is placed on top of the printed product. The thickness of the printed products is then determined by calculating the distance between the measuring faces of the sensing elements and the associated sensors. A predetermined value is also utilized such that if the calculated thickness is outside a range of acceptable measurements, an error signal will be generated.

The subject-matter of the invention is explained in more detail below with reference to the drawings in which like numerals reference like elements.

BRIEF DESCRIPTION OF THE DRAWINGS

FIG. 4 shows an enlarged side view of a scanning unit of the measuring device of the present invention during the measuring phase;

FIG. 5 shows the sensing element of FIG. 4 resting on a printed product; and

DESCRIPTION OF THE PREFERRED EMBODIMENTS

Figure 1:
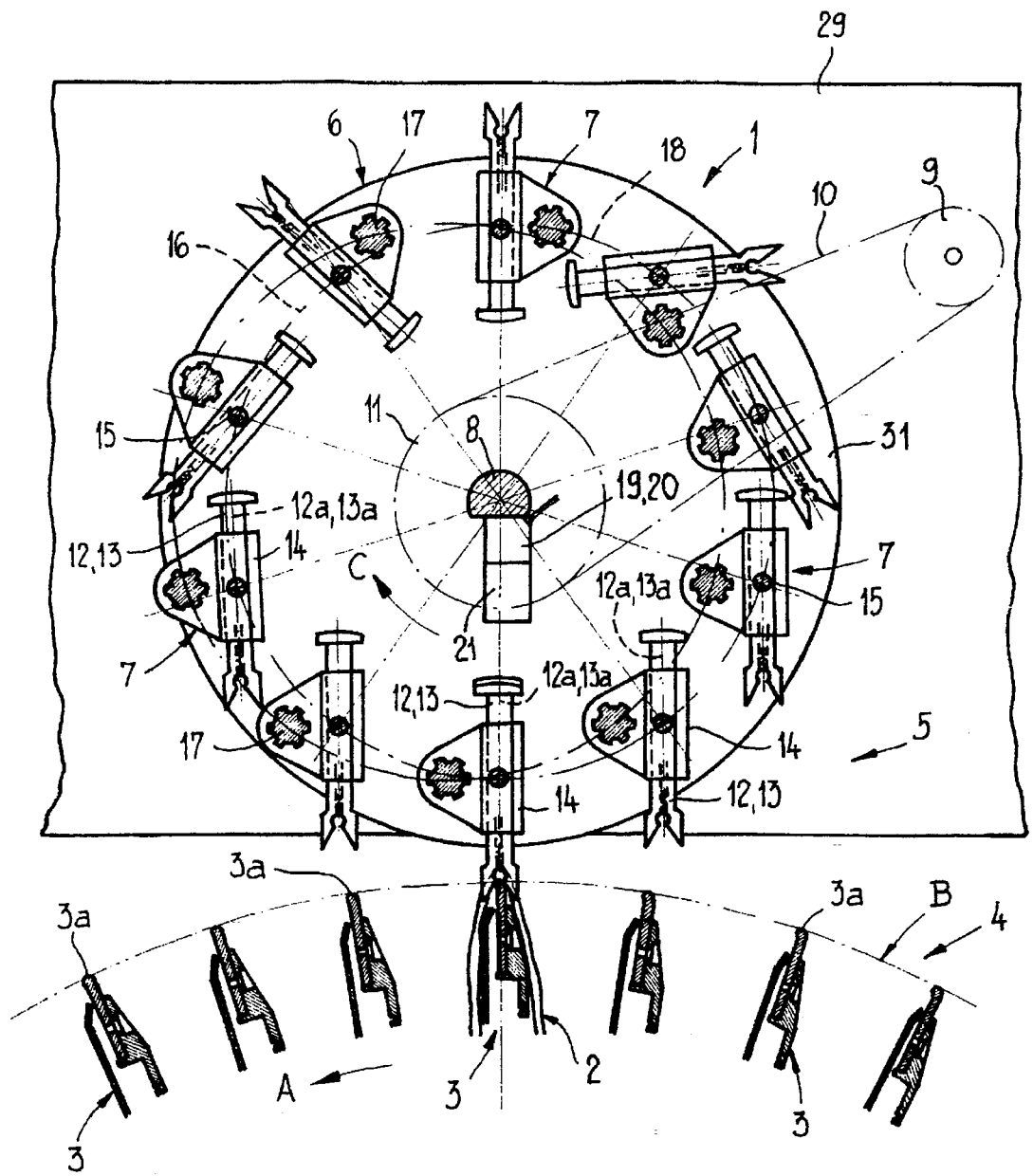
FIG. 1 shows in a simplified side view the measuring device of the instant invention for measuring the thickness of printed products supported by the saddle-shaped support of a gathering drum (only partially shown)

In FIG. 1 there is shown purely diagrammatically, in side view, a measuring device 1 for measuring the thickness of printed products 2, i.e., newspapers, periodicals, and parts thereof which are supported by saddle-shaped supports 3 of gathering drum 4, which is known in the prior art, and which is only partially represented. The mutually parallel supports 3 rotate about an axis (which is not shown in FIG. 1) in the direction of the arrow A and extend transversely with respect to this direction of rotation A. The ends of the supports 3 on the resting side are denoted by 3a. These ends 3a move during the rotation of the gathering drum along a circular-cylindrical path of movement B, the center of which coincides with the axis of rotation of the gathering drum 4.

The measuring device 1 has a measuring wheel 6, which is arranged at a measuring station 5 and the construction of which will be explained in more detail with reference to FIGS. 2–5. Associated with the measuring wheel 6 are a number of scanning units 7 which are driven in circular motion about a fixed spindle 8 in the direction of the arrow C. The number of scanning units 7 is an integral fraction of the number of supports 3 of the gathering drum 4, so that during the rotation of the gathering drum 4 and of the measuring wheel 6, each scanning unit 7 always coincides with the same supports 3. In the case of the present exemplary embodiment, there are forty supports 3 and ten scanning units 7.

The drive of the measuring wheel 6 is performed by a driven belt pulley 9 via a drive belt and a second belt pulley 11 connected in a rotationally fixed manner to the measuring wheel 6.

Figure 3:
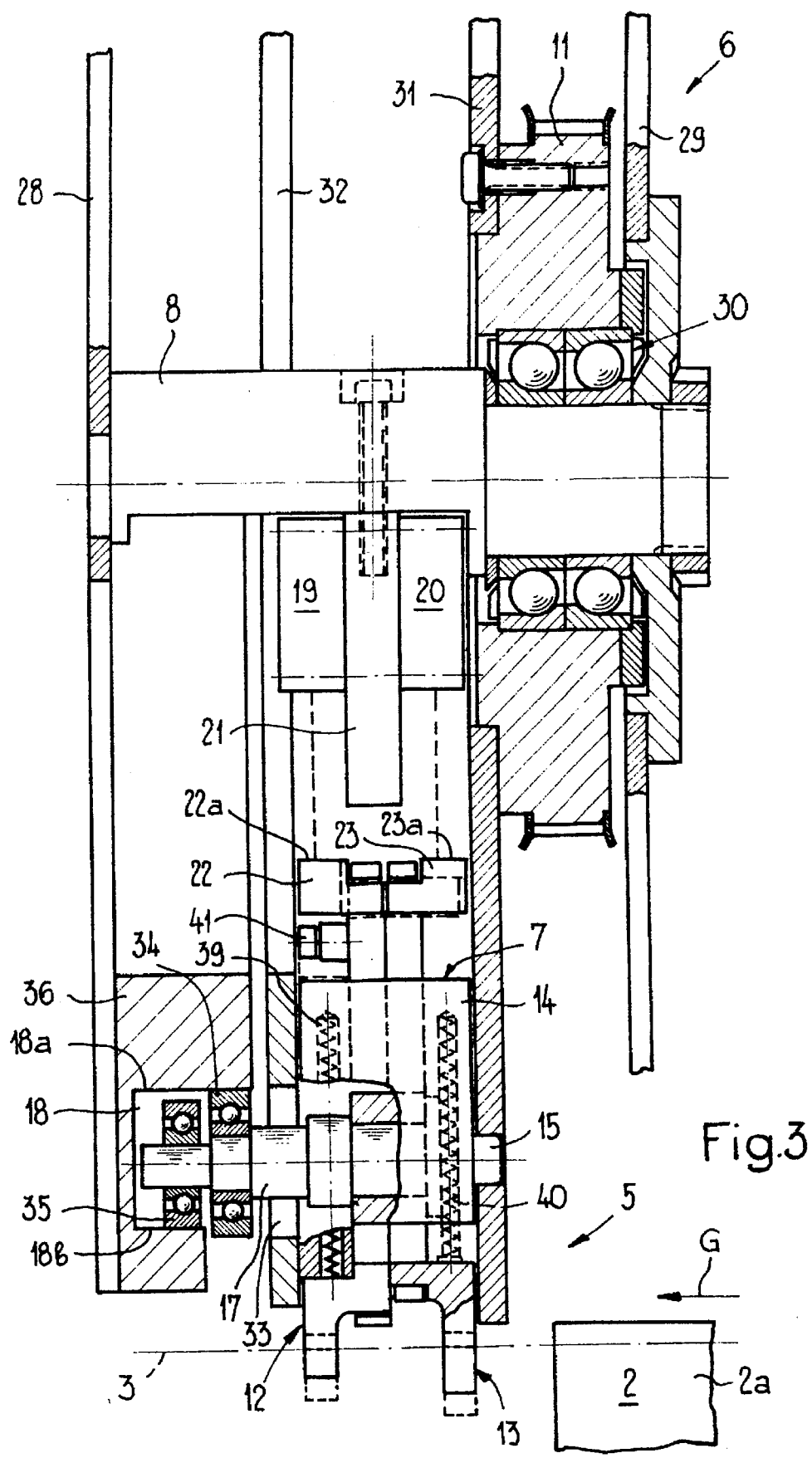
FIG. 3 shows a cross-sectional view taken along line III—III of FIG. 2.

Each scanning unit 7 has two sensing elements 12, 13 arranged one behind the other seen in the longitudinal direction of the supports 3 (see FIG. 3). These sensing elements 12, 13 are guided displaceably in the direction of their longitudinal axis 12a, 13a, respectively, in a support (housing) 14, as still to be explained in more detail. The support 14 is mounted such that it can swivel about a spindle 15. These spindles 15 move during the rotation of the measuring along a circular path 16. The supports 14 are further connected firmly to control shafts 17, one end of which is guided in a fixed control groove 18, the course of which is only indicated diagrammatically by a dashed line in FIG. 1.

With each sensing element 12, 13 there interacts a laser sensor 19, 20, respectively. These laser sensors 19, 20 are fastened on the fixed spindle 8 and are arranged one behind the other seen in the longitudinal extent of the supports. Between the laser sensors 19, 20 there is provided a shielding plate 21 which is firmly screwed on the shaft 8 and on which the laser sensors 19, 20 are fastened (see FIG. 3). Examples of laser sensors which may be used as sensors 19, 20 are those sold by the Omron Corporation under the product name Z4M.

Figure 2:
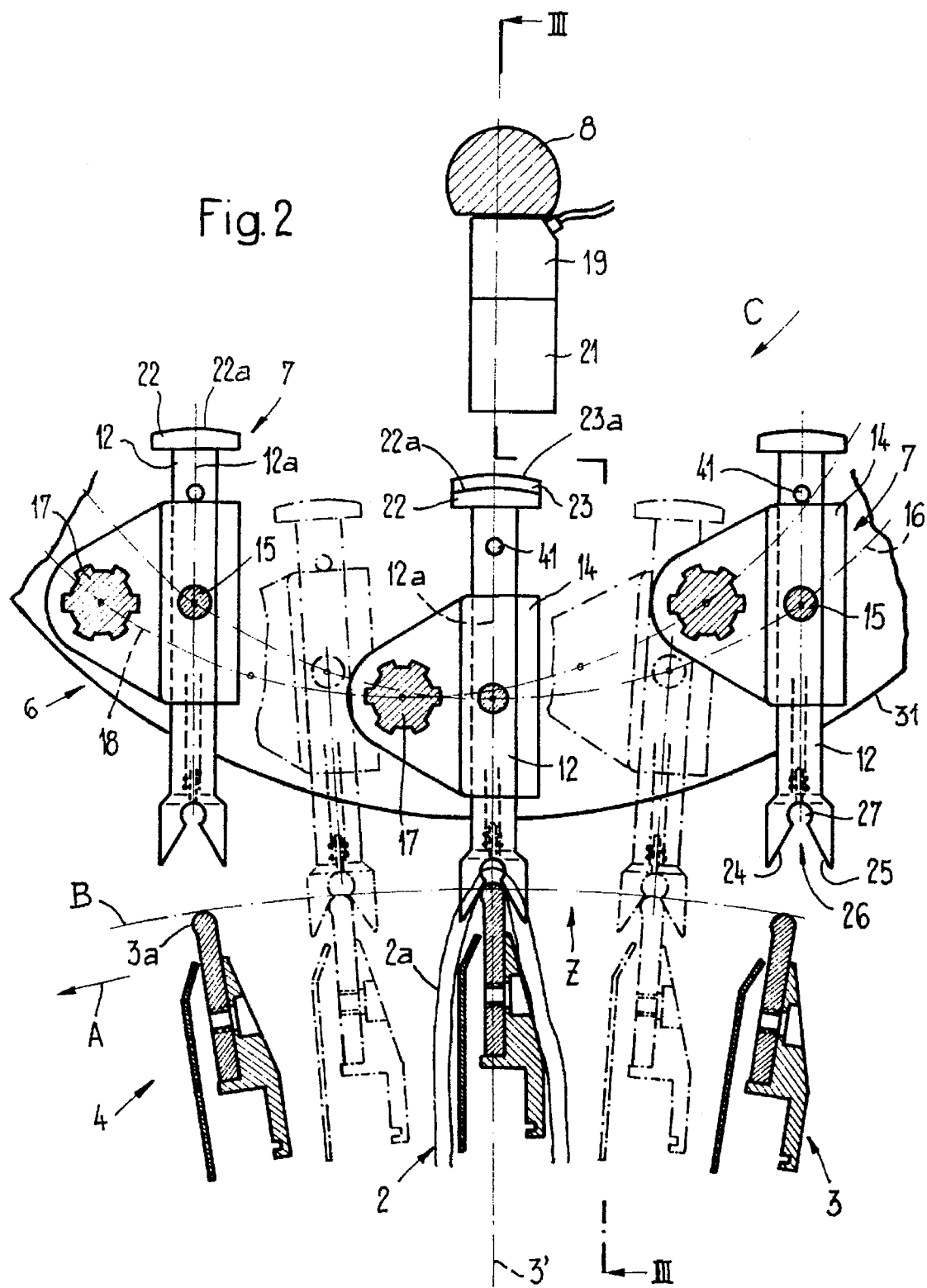
FIG. 2 shows, in enlarged scale, part of the measuring device and gathering drum.

The construction of the measuring wheel 6 is now explained in more detail with reference to FIGS. 2–5. Each sensing element 12, 13 has at the end facing the spindle 8 a head 22, 23, respectively, which bears an arched measuring face 22a, 23a, respectively. In the measuring position, shown in FIGS. 2–4, of the sensing elements 12, 13, those measuring faces 22a, 23a are facing the assigned laser sensor 19, 20, respectively (see FIG. 3). In this measuring position, the sensing elements 12, 13 are in alignment in the radial direction with the respectively assigned support 3, i.e., the longitudinal axis 12a, 13a of the sensing elements 12, 13 lie in the center plane 3' of the assigned support 3 (FIG. 2). The arching of the measuring faces 22a, 23a is such that, in the measuring position of the sensing elements 12, 13, it is coaxial with respect to the path of movement B of the ends 3a of the supports 3 on the resting side. The reason for this will be further explained in conjunction with FIG. 4.

At the end opposite the heads 22, 23, facing the supports 3, each sensing element 12, 13 has two supporting faces 24, 25 which are arranged in the shape of a V with respect to each other and define a groove 26 of V-shaped cross-section. At the bottom of this groove 26 there is arranged a recess 27 of substantially circular cross-section.

As FIG. 3 reveals, the spindle 8 is held fixed in place in two side walls 28, 29. The belt pulley 11 is mounted rotatably on this spindle 8 by means of a ball bearing 30. The belt pulley 11 is firmly connected to a bearing plate 31 which serves together with a bearing race 32, arranged at a distance, for bearing the scanning units 7. For this purpose, the swivel spindles 15 of the supports 14 are mounted in these two bearing elements 31, 32. Through openings 33 in the bearing race 32 there extend the control shafts 17, which are, as mentioned, firmly connected to the supports 14 and which bear at their free end two ball bearings 34, 35, which run along in each case a control cam 18a, 18b, respectively, of the control groove 18 formed in a ring 36.

On each of the sensing elements 12, 13 mounted displaceably in the support 14, there acts a compression spring 39, 40, respectively, which is accommodated in the support 14 and has the tendency to press the assigned sensing element 12, 13 out of the housing. On the sensing element 12 there is a stop bolt 41 which, when sensing elements 12, 13 are not situated on the supports 3, comes to bear against the support 14 and thus limits the distance by which the sensing elements 12, 13 are pushed out of the support 14 under the action of the compression springs 39, 40. The sensing element 13 is coupled to the other sensing element 12 by means of a driving type of connection (for example a keyed connection), not represented in any more detail, for joint movement. This driving type of connection is, however, designed in such a way that the sensing element 13 can be displaced with respect to the other sensing element 12 counter to the direction in which the compression spring 40 acts.

As revealed by FIG. 4, each laser sensor 20 has a transmitter 42 and a receiver 43. The laser beam 44 emitted from the transmitter 42 is reflected at the measuring face 22a or 23a and received by the receiver 43. In FIG. 4, the laser beam reflected at the measuring face 22a is denoted by 45 and the laser beam reflected at the measuring face 23a is denoted by 45'.

Figure 6:
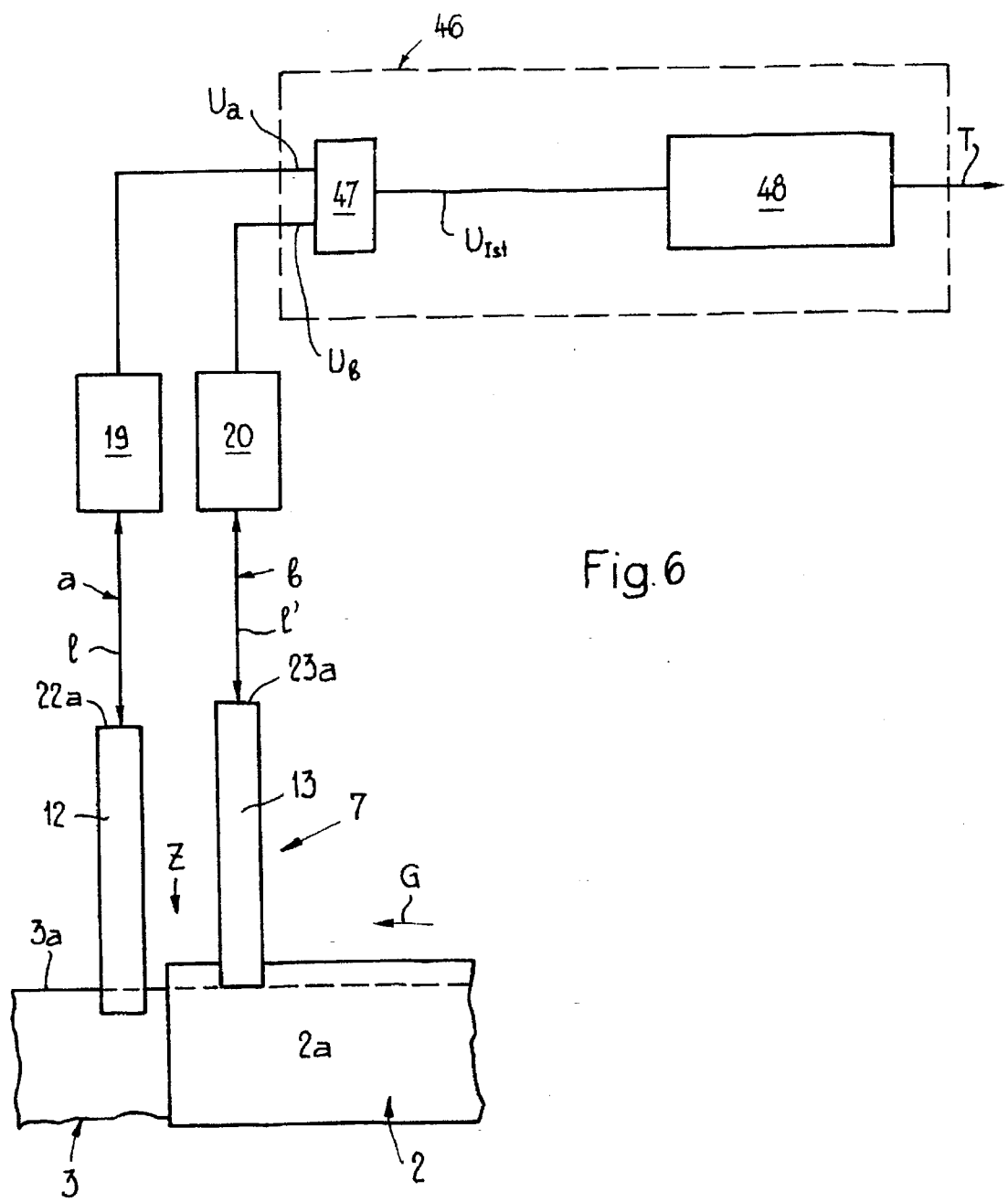
FIG. 6 shows a simplified representation of the measuring device of the present invention.

Before FIGS. 4–6 are discussed in more detail, the mode of operation of the measuring device 1 is explained. Upon turning of the measuring wheel 6 the supports 14 are swivelled in the direction of the arrow D or D' by the control shafts 17 guided in the control groove 18 (FIG. 4). This control mechanism for the scanning units 7 is designed such that, upon running into the measuring zone Z (FIG. 2), the supports 14 and the sensing elements 12, 13 are aligned more and more with the supports 3, likewise arriving in the measuring zone Z, as revealed by FIG. 1 and, in particular, by FIG. 2. Under the action of the compression springs 39, 40, the sensing elements 12, 13 are extended up to the stop of the stop bolt 41 on the support 14, as can be seen with respect to the scanning unit 7 on the extreme right in FIG. 2. In a next phase, which is represented by the scanning unit 2 shown by dot-dashed lines on the right-hand side in FIG. 2, the sensing elements 12, 13 come into contact with the assigned support 3, or the printing product 2 resting on the latter, but without already being pressed back. Upon further turning, the pressing back of the sensing elements 12, 13 by the support 3, or the printing product 2 to be measured, counter to the action of the compression springs 39, 40 takes place, as is represented by the central scanning unit 7 in FIG. 2, located in the measuring position. Subsequently, the support 3 and the sensing elements 12, 13 begin to detach themselves from one another as is represented on the left-hand side of FIG. 2 by the two scanning units 7 shown by dot-dashed lines and by solid lines.

As clearly revealed in particular by FIGS. 4 and 5, in the measuring position, the sensing elements 12, 13 rest with their sloping supporting faces 24, 25 laterally on the support 3, or on the upper side 2a of the printing product 2. This has as a consequence, on the one hand, a centering of the sensing elements 12, 13 with the support 3, and on the other hand, an increase in the measuring sensitivity. As revealed by FIG. 5, the supporting faces 24, 25 of the sensing element 13 to the sides of the fold F of the printing product 2 come to rest on the latter. The fold F comes to lie in the recess 27. It is readily evident that in this way the state of the fold F has no influence on the measurement.

In the measuring zone Z, i.e., with scanning unit 7 located in the measuring position, the sensing element 12 rests on the support 3, and the sensing element 13 rests on the upper side 2a of the printing product 2 to be measured, as revealed by FIGS. 4 and 6. The sensing element 13 is accordingly pressed back more than the sensing element 12. In the measuring position of the scanning unit 7, the distances between the measuring face 22a of the sensing element 12 and the assigned laser sensor 19 on the one hand and between the measuring face 23a of the sensing element 13 and the assigned laser sensor 20 on the other hand are measured. In FIG. 6, the corresponding distances are denoted by a and by b, respectively. The length of the distance a is specified by l and that of the distance b by l's. Each laser sensor 19, 20 generates an output signal $U_a$, and $U_b$, respectively (FIG. 6), which is indicative of the length l, l's of the distances a and b, respectively. These output signals $U_a$ and $U_b$ are fed to an evaluation unit 46, which has a signal processing part 47, in which the signals $U_a$ and $U_b$ are compared with one another. The signal processing part 47, which also has a compensation part for compensating for constant, system-inherent measuring inaccuracies, generates an output signal $U_{Ist}$, which corresponds to the difference between the lengths l and l's and is consequently indicative of the thickness of the measured product 2. This actual value signal $U_{Ist}$ is then used to detect incomplete printing products 2, i.e., those in which pages, parts, or supplements are missing, or those which comprise too many pages, parts, or supplements. For this purpose, the actual value signal $U_{Ist}$ is fed to a comparison unit 48 in which this actual value signal $U_{Ist}$ is compared with a prescribed, stored set value. If in this comparison the comparison unit 48 establishes a difference which exceeds a given limit value, it generates a code signal T which is used for rejecting the printing product 2 detected as incomplete.

For an exact measurement, the measuring conditions must remain the same during a certain period of time. To ensure this even in the case of a fast-running gathering drum, i.e., with thickness measurements on 40,000 printing products 2 per hour, the scanning units 7, i.e., the sensing elements 12, 13 are kept aligned with the assigned support 3 by the explained control mechanism of the measuring wheel 6 during a certain time. In this aligned measuring position of the scanning units 7, as already mentioned, the measuring faces 22a, 23a of the sensing elements 12, 13 run coaxially with respect to the path of movement B of the support ends 3a or of the products 2. This means that the lengths l, l's of the distances a, b remain constant during a certain time, during which the heads 22, 23 of the sensing elements 12, 13 run past the fixed laser sensors 19, 20. In this way, it is ensured that the measuring conditions remain the same during the required measuring period. In FIG. 4, the positions of the heads 22, 23 of the sensing elements 12, 13 at the beginning of the measuring phase (position E) and at the end of the measuring phase (position E') are indicated by dashed lines.

With reference to FIGS. 3 and 6, it is also pointed out that the products 2 are pushed forward along the supports 3 in the direction of the arrow With the described construction of the measuring device 1, it is possible to compensate for any manufacturing inaccuracies, such as in particular irregularities in the concentricity of the gathering drum 4 and inaccuracies which originate from the production of the supports 3 and of the measuring wheel 6. For this purpose, measurements without products are carried out in the described way on the rotating gathering drum 4, in which both sensing elements of each scanning unit 7 are set down onto the assigned support 3. The measured values thus determined for each support 3 and the assigned scanning unit 7 are stored in the evaluation unit 46. In the following thickness measurement, these measured values are used for compensation in the signal processing part 47.

For determining the set value of the thickness of the products to be measured, before the actual measuring operation there takes place, a reference thickness measurement on a certain number of products which have been completely put together is input. From the thickness reference values thus determined, then the thickness set value is determined and stored in the comparison unit 48.

The thickness measuring principle described above with reference to the measuring device 1, which interacts with a gathering drum 4, can also be applied in the case of other gathering devices, such as are described, for example, in EP-A-O 095 603 (and the corresponding U.S. Pat. No. 4,489,930) and EP-A-O 346 78 (and the corresponding U.S. Pat. No. 5,104,108). In the case of such gathering devices, the supports arranged one behind the other and extending transversely with respect to the direction of movement move in a straight line through the measuring station. This means that the path of movement of the circulating scanning units 7 of the measuring device 1 has to be adapted to this straight path of movement of the supports 3, or of the products. Furthermore, the sensing elements, or their heads, are to be designed with planar measuring faces. In the measuring area, these measuring faces then run parallel to the path of movement of the supports or products.

Furthermore, it is also possible by means of the measuring principle described to measure the thickness of products resting flat on a planar support. It is apparent that the measuring device then has to be designed correspondingly.

The measuring principle described may also be used for checking completeness in personalized or regionalized gathering or inserting.

The thickness measurement explained above can also be used for establishing the type of different printing products which differ in thickness from one another.

While particular embodiments of the invention have been described, it will be understood, of course, the invention is not limited thereto since modifications may be made by those skilled in the art, particularly in light of the foregoing teachings. It is, therefore, contemplated by the appended claims to cover any such modifications as incorporate those features of these improvements within the true spirit and scope of the invention.

That which is claimed is:

1. A process for measuring the thickness of printed products in a production line comprising the steps of:

supporting a printed product upon a support while advancing the support past a measuring station;

providing a first fixed sensor and using the first sensor to detect a first distance between said first sensor and the support as the support advances past the measuring station;

providing a second fixed sensor and using the second sensor to detect a second distance between said second sensor and an upper side of the supported printed product as the printed product advances past the measuring station, said upper side facing away from said support;

calculating the difference between said first and second distances to determine the thickness of said printed product;

providing a first sensing element associated with said first sensor and having a first measuring face;

providing a second sensing element associated with said second sensor and having a second measuring face;

resting said first sensing element on the support and resting said second sensing element on top of the printed product as the support and printed product advance past the measuring station;

advancing said first and second sensing elements with the support and printed product upon which the first and second sensing elements rest; and wherein the step of using the first sensor to detect a first distance includes measuring the distance between said first measuring face and said first sensor, and wherein the step of using the second sensor to detect a second distance includes measuring the distance between said second measuring face and said second sensor.

2. A process according to claim 1, further including the steps of:

establishing a predetermined limit value for the thickness of the printed products;

comparing the determined thickness of the printed products which advance past the measuring station with the predetermined limit value; and generating an error signal if the determined thickness of the printed product exceeds the predetermined limit value.

3. A device for measuring the thickness of printed products comprising:

means including a plurality of supports for moving said printed products past a measuring station, with the printed products being individually supported upon respective ones of the supports;

a first and a second fixed sensor mounted at said measuring station;

said first sensor being positioned to detect a first length characteristic of the distance between said first sensor and each support as each support moves past said measuring station, and which serves as a reference point;

said second sensor being positioned to detect a second length characteristic of the distance between said second sensor and an upper side of each printed product as each printed product moves past said measuring station, said upper side being the side facing away from its associated support;

an evaluation unit which evaluates said first and second length characteristics supplied from said first and second sensors and determines a difference between said length characteristics for each printed product which difference corresponds to the thickness of the printed product;

at least one scanning unit comprising a first and second sensing element, said first sensing element being associated with said first sensor and said second sensing element being associated with said second sensor;

means mounting said one scanning unit so as to move along with at least one of said supports past said measuring station, and such that said first sensing element contacts said at least one support during the measuring of said printed products and said second sensing element contacts the upper side of said printed products; and said first and second sensing elements each comprising a measuring face which faces respective ones of said first and second sensors as said one scanning unit moves past said measuring station, wherein the distances between said measuring faces and respective associated sensors are measured to calculate the thickness of the printed products.

4. A device for measuring the thickness of printed products according to claim 3, wherein each of said supports is saddle-shaped and moves along a closed path of travel and extends transversely to the direction of support movement; and wherein said measuring faces of said sensing elements run substantially parallel with the path of movement of said supports as said supports move past the measuring station.

5. A device for measuring the thickness of printed products according to claim 4, wherein:

said saddle-shaped supports are mounted for rotation about a common axis and said supports include supporting ends which define a circular path of movement; and said means mounting said one scanning unit comprises means mounting said sensing elements so that said sensing elements are radially aligned with said at least one support as said sensing elements move past the measuring station, and said measuring faces are arched so as to be coaxially arranged to the circular path of movement of the supporting end of said at least one support as said sensing elements move past the measuring station.

6. A device for measuring the thickness of printed products according to claim 3, wherein each of said supports is saddle-shaped and moves along a closed path of travel and extends transversely to the direction of support movement;

wherein said measuring faces of said sensing elements run substantially parallel with the path of movement of said at least one support as said sensing elements move past the measuring station; and said sensing elements each include a supporting face which has a substantially V-shaped configuration and which contacts said at least one support or printed product while the product thickness is being measured.

7. A device for measuring the thickness of printed products according to claim 6, wherein said second sensing element which comes into contact with the printed products includes a recess at the bottom of a V-shaped groove defined by said supporting face, which recess is adapted to receive a fold of said printed products while the product thickness is being measured.

8. A device for measuring the thickness of printed products according to claim 3, further comprising a support member and a spring element for resiliently mounting each of said sensing elements in said support member.

9. A device for measuring the thickness of printed products according to claim 8, wherein said second sensing element resting on said product is coupled with said first sensing element for joint movement; and said second sensing element is displaceable relative to said first sensing element when said second sensing element is forced back in said support member against the action of said spring element.

10. A device for measuring the thickness of printed products according to claim 3, further comprising:

a plurality of said scanning units which are mounted to move along a closed path; and said scanning units each comprising one of said first sensing elements and one of said second sensing elements wherein said scanning units run synchronously with said printed products through said measuring station.

11. A device for measuring the thickness of printed products according to claim 10, wherein said supports are moved along a closed path of movement and arranged one behind the other and extend transversely to the direction of support movement; and wherein said plurality of scanning units are provided in a number which is an integral fraction of the number of said supports.

12. A device for measuring the thickness of printed products according to claim 3, wherein said evaluation unit compares a value based upon the measured thickness of the printed products with a standard set value and calculates the difference between these values and compares it to a predetermined acceptable deviation to generate a code signal in case said difference between the values exceeds said deviation.

13. A device for measuring the thickness of printed products according to claim 3 wherein said first and second sensors are each laser sensors.

14. A process for measuring the thickness of printed products in a production line comprising the steps of:
   supporting a printed product upon a support while advancing the support past a measuring station;
   providing a first fixed laser sensor and a first sensing element associated with the support and using the first laser sensor and the first sensing element to detect a first distance between said first laser sensor and the support as the support advances past the measuring station;
   providing a second fixed laser sensor and a second sensing element associated with an upper side of the supported printed product, and using the second laser sensor and the second sensing element to detect a second distance between said second laser sensor and an upper side of the supported printed product as the printed product advances past the measuring station, said upper side facing away from said support;
   advancing said first and second sensing elements in the support advancing direction when detecting said first and second distances, and
   calculating the difference between said first and second distances to determine the thickness of said printed product.

15. A process according to claim 14, further including the steps of:
   establishing a predetermined limit value for the thickness of the printed products;
   comparing the determined thickness of the printed products which advance past the measuring station with the predetermined limit value; and
   generating an error signal if the determined thickness of the printed product exceeds the predetermined limit value.

16. A device for measuring the thickness of printed products comprising:
   means including a plurality of supports for conveying said printed products past a measuring station, with the printed products being individually supported upon respective ones of the supports;
   a first and a second fixed laser sensor mounted at said measuring station;
   at least one scanning unit movable in the product conveying direction during a printed product thickness detecting operation and comprising a first and a second sensing element, said first sensing element being associated with said first sensor and said second sensing element being associated with said second sensor,
   said first laser sensor and said first sensing element being positioned to detect a first length characteristic of the distance between said first laser sensor and each support as each support moves past said measuring station, said first laser sensor producing a first signal representative of said first length and which serves as a reference point;
   said second laser sensor and said second sensing element being positioned to detect a second length characteristic of the distance between said second laser sensor and an upper side of each printed product as each printed product moves past said measuring station, said upper side being the side facing away from its associated support; said second laser sensor producing a second signal representative of said second length; and
   an evaluation unit which evaluates said first and second signals supplied from said first and second laser sensors and determines from these signals a difference between said first and second lengths for each printed product which difference corresponds to the thickness of the printed product.

17. A device for measuring the thickness of printed products according to claim 16,
   wherein said at least one scanning unit comprises a plurality of said scanning units mounted for rotation about a fixed first axis so that each of the scanning units moves past the measuring station in radial alignment with one of said supports,
   said first sensing element of each scanning unit including a first measuring face and a first supporting face, with the first measuring face being aligned with said first laser sensor and with the first supporting face contacting the associated support as the first sensing element moves past the measuring station, and
   said second sensing element of each scanning unit including a second measuring face and a second supporting face, with the second measuring face being aligned with said second laser sensor and with the second supporting face contacting the printed product on the associated support as the second sensing element moves past the measuring station.

18. A device for measuring the thickness of printed products according to claim 17 wherein said plurality of supports are mounted for rotation about a second fixed axis which is parallel to and spaced from said fixed first axis.

* * * * *